United States Patent
Herold et al.

(10) Patent No.: US 8,258,193 B2
(45) Date of Patent: Sep. 4, 2012

(54) PROCESS FOR REMOVAL OF HYDROGEN CYANIDE AND AMMONIA FROM SYNTHESIS GAS

(75) Inventors: Rudolf Henri Max Herold, Amsterdam (NL); Thijme Last, Amsterdam (NL); Cornelis Jacobus Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 204 days.

(21) Appl. No.: 12/664,539

(22) PCT Filed: Jun. 16, 2008

(86) PCT No.: PCT/EP2008/057527
§ 371 (c)(1),
(2), (4) Date: Apr. 22, 2010

(87) PCT Pub. No.: WO2008/155305
PCT Pub. Date: Dec. 24, 2008

(65) Prior Publication Data
US 2010/0204533 A1    Aug. 12, 2010

(30) Foreign Application Priority Data

Jun. 18, 2007 (EP) .................................. 07110431

(51) Int. Cl.
*C07C 27/00* (2006.01)
*C01C 3/00* (2006.01)

(52) U.S. Cl. ............... 518/700; 423/236; 423/237
(58) Field of Classification Search ............... 518/700; 423/236, 237
See application file for complete search history.

(56) References Cited

U.S. PATENT DOCUMENTS

| 3,475,330 A | 10/1969 | Gilles ............... 210/25 |
| 3,878,289 A | 4/1975 | Beavon ............... 423/219 |
| 4,271,133 A | 6/1981 | Tellis ............... 423/230 |
| 4,564,455 A | 1/1986 | Flynn et al. ............... 210/675 |
| 6,107,353 A | 8/2000 | Koveal et al. ............... 518/705 |
| 2001/0019844 A1 | 9/2001 | Kishkovich et al. ............... 436/177 |
| 2005/0212174 A1 | 9/2005 | Tanahashi et al. ............... 264/286 |

FOREIGN PATENT DOCUMENTS

| EP | 661375 | 7/1995 |
| WO | WO2006008317 | 1/2006 |
| WO | WO2007082896 | 7/2007 |

OTHER PUBLICATIONS

Van Der Burgt, M.: The Shell Middle Distillate Synthesis Process, Petroleum Review Apr. 1990, pp. 204-209.

*Primary Examiner* — Jafar Parsa
(74) *Attorney, Agent, or Firm* — Charles W. Stewart

(57) ABSTRACT

The invention provides a process for removal of HCN and $NH_3$ from synthesis gas, the process comprising the steps of: (a) contacting feed synthesis gas comprising HCN with a HCN hydrolysis sorbent in the presence of water, thereby obtaining synthesis gas comprising $NH_3$; (b) contacting the synthesis gas comprising $NH_3$ with an acidic cation exchange resin in the presence of water to remove $NH_3$, thereby obtaining purified synthesis gas.

10 Claims, No Drawings

PROCESS FOR REMOVAL OF HYDROGEN CYANIDE AND AMMONIA FROM SYNTHESIS GAS

The present application claims priority from European Patent Application 07110431.9 filed 18 Jun. 2007.

The invention relates to a process for removal of hydrogen cyanide (HCN) and ammonia ($NH_3$) from synthesis gas.

Synthesis gas mainly comprises carbon monoxide and hydrogen and further usually comprises carbon dioxide, while also nitrogen, HCN and steam may be present, as well as some other minor constituents. Synthesis gas is generally used for chemical processes. In particular, synthesis gas can be used for the preparation of hydrocarbons in a catalytic process, for example the well-known Fischer-Tropsch process.

Synthesis gas is usually prepared in a synthesis gas generation unit, for example a high temperature reformer, an autothermal reformer or a gasifier using coal, oil residue or natural gas as feedstock.

Generally, natural gas comprises mainly methane and can further comprise other components such as lower hydrocarbons (e.g. ethane, propane, butane, pentane), nitrogen, carbon dioxide, contaminants and traces of oxygen and hydrogen. The amount and type of contaminants can vary. Common contaminants are HCN, $H_2S$, mercaptans (RSH) and COS.

Often, removal of contaminants, especially of HCN, from the feedstock used for the preparation of synthesis gas is difficult to achieve or incomplete. Consequently, unwanted contaminants are still present in synthesis gas. Removal of these contaminants from synthesis gas to low levels is of considerable importance, because they may bind irreversibly on catalysts and cause poisening. This results in a deactivated catalyst, which severely hampers the catalytic process. To this end, removal of HCN to very low levels, in the ppb range, is required.

Processes for removal of HCN and $NH_3$ from synthesis gas are known in the art. For example, in U.S. Pat. No. 6,107,353 a process is described wherein HCN is removed from a synthesis gas by contacting the synthesis gas with a metal oxide catalyst at a temperature in the range of from 150-350° C. to form $NH_3$. The resulting synthesis gas is washed in an $NH_3$ scrubber to remove $NH_3$. The $NH_3$ scrubber is operated at a temperature in the range of from 25-120° C. The scrubbed synthesis gas is led through a series of adsorption zones to remove residual HCN and $NH_3$. Finally, the resulting purified synthesis gas is used in a hydrocarbon synthesis process, performed at a temperature in the range of from 150-350° C.

A disadvantage of the process described in U.S. Pat. No. 6,107,353 is that many steps are needed to produce a purified synthesis gas suitable for use in a hydrocarbon synthesis step. Furthermore, because the difference in operation temperature of the different steps, the degree of variation in temperature in the overall process, the so-called temperature swing, is high. This reduces the overall operational efficiency of the process because additional heating and cooling is needed. In addition, the process requires a higher capital expenditure as additional heating and cooling equipment is needed.

Thus, there is a need for a simple process enabling removal of HCN and $NH_3$ from synthesis gas without the disadvantages mentioned hereinabove.

HCN is difficult to remove from synthesis gas because of its low solubility in common solvents and because it is usually present in low concentration, typically below 100 ppmv, making removal by solid adsorption difficult. Removal of HCN through alkaline scrubbing is hampered by the presence of other acidic compounds. It has now been found that removal of both HCN and $NH_3$ to low levels can be achieved via a simple two-step process, wherein $NH_3$ is removed using an acidic cation exchange resin.

To this end, the invention provides a process for removal of hydrogen cyanide and ammonia from synthesis gas, the process comprising the steps of:

(a) contacting feed synthesis gas comprising HCN with a HCN hydrolysis sorbent in the presence of water, thereby obtaining synthesis gas comprising $NH_3$;

(b) contacting the synthesis gas comprising $NH_3$ with an acidic cation exchange resin in the presence of water to remove $NH_3$, thereby obtaining purified synthesis gas.

The present invention enables removal of HCN to levels in the ppbv range, even from feed synthesis gas comprising other contaminants such as $H_2S$ and/or COS. Suitably, HCN is removed to levels below 20 ppbv, or even below 10 ppbv. The invention enables removal of $NH_3$ to levels in the ppbv range. Suitably, $NH_3$ is removed to levels below 10 ppbv, or even below 5 ppbv.

The purified synthesis gas, because of its low level of HCN and $NH_3$, is especially suitable for use in a catalytic reaction. In particular, the purified synthesis gas is suitable for use in a Fischer Tropsch hydrocarbon synthesis reaction, especially when using a cobalt catalyst.

Typically, the feed synthesis gas is generated in a synthesis generation unit such as a high temperature reformer, an autothermal reformer or a gasifier. See for example Maarten van der Burgt et al., in "The Shell Middle Distillate Synthesis Process, Petroleum Review April 1990 pp. 204-209".

Synthesis gas generated in reformers comprises conventionally substantial amounts of carbon monoxide and hydrogen and further comprises carbon dioxide, steam, various inert compounds and impurities such as HCN and sulphur compounds. Synthesis gas generated in gasifiers conventionally comprises lower levels of carbon dioxide.

The synthesis gas generated from a feedstock may comprise particulate matter, for example soot particles. Therefore, in a preferred embodiment synthesis gas exiting a synthesis gas generation unit is contacted with scrubbing liquid in a soot scrubber to remove particulate matter, in particular soot, thereby obtaining the feed synthesis gas comprising HCN. Synthesis gas exiting the synthesis gas generating unit is generally at elevated temperature and/or elevated pressure. Especially in the event that the synthesis gas is generated in a gasifier, the synthesis gas exiting the gasifier will be at elevated temperature and at elevated pressure. To avoid additional cooling and/or depressurising steps, the scrubbing step in the soot scrubber is preferably performed at elevated temperature and/or at elevated pressure. Preferably, the temperature at which the synthesis gas is contacted with scrubbing liquid is in the range of from 120 to 160° C., more preferably from 130 to 150° C. Preferably, the pressure at which the synthesis gas is contacted with scrubbing liquid is in the range of from 20 to 80 bara, more preferably from 20 to 60 bara.

It will be understood that the amount of HCN in the feed synthesis gas can vary, depending on the feedstock used to generate the feed synthesis gas. Generally, the amount of HCN in the feed synthesis gas is in the range of from 20 ppbv to 100 ppmv. The amount of HCN in the purified synthesis gas is preferably below 20 ppbv, more preferably below 10 ppbv, most preferably below 7 ppbv. It will be understood that the lower level of HCN depends on the analytical techniques used to determine the amount of HCN. Generally, a detection limit of about 5-7 ppbv applies. In the most preferred embodiment, the amount of HCN in the purified synthesis gas is below the detection limit of HCN.

In step (a), the feed synthesis gas is contacted with HCN hydrolysis sorbent. Suitable HCN hydrolysis sorbents comprise an HCN hydrolysis catalyst.

In one preferred embodiment, the HCN hydrolysis sorbent comprises one or more oxides of a metal selected from Group VI and Group IVB of the Periodic Table of the Elements, more preferably from Group IVB (Zr, Ti, Hf). References to the Periodic Table and groups thereof used herein refer to the previous IUPAC version of the Periodic Table of Elements such as that described in the 68th Edition of the Handbook of Chemistry and Physics (CRC Press). Oxides of alumina and at least one of Mo and Ti are especially preferred.

In another, more preferred, embodiment the HCN hydrolysis sorbent comprises one or more metals or oxides of metals or combinations thereof, the metals being selected from the group of Ag, Sn, Mo, Fe and Zn. An especially preferred HCN hydrolysis sorbent is ZnO, because of its good performance. The use of these type of HCN hydrolysis sorbents enable removal of HCN to levels in the ppbv range, while also removal of acidic components such as $H_2S$ and/or COS can be achieved. It will be understood that the amount of COS and/or $H_2S$ in the feed synthesis gas depends on the amount of these contaminants present in the feedstock used to generate the feed synthesis gas.

Typically, the amount of $H_2S$ and COS in the feed synthesis gas will be up to 10 ppmv, preferably up to 5 ppmv. The amount of $H_2S$ is preferably up to 500 ppbv $H_2S$, still more preferably up to 300 ppbv $H_2S$ and most preferably up to 100 ppbv $H_2S$, based on the total feed synthesis gas.

Generally, the amount of COS in the feed synthesis gas is from about 1 ppbv to about 500 ppbv, preferably from about 2 ppbv to about 200 ppbv, more preferably from about 10 ppbv to about 100 ppbv, based on the feed synthesis gas.

The preferred amounts of $H_2S$ and/or COS will translate into amounts of $H_2S$ and/or COS in the purified synthesis gas in the ppbv range.

The ratio between $H_2S$ and COS in the feed synthesis gas is set by the equilibrium between COS and $H_2S$ at the conditions prevailing in the feed synthesis gas generating unit. The process according to the invention is especially suitable for feed synthesis gas having a $H_2S$:COS ratio in the range from 100:40 to 90:30, preferably about 95:5 (oil residue derived synthesis gas) and for feed synthesis gas having a $H_2S$:COS ratio in the range 80:20 to 90:10 (coal derived synthesis gas).

It is an advantage of the process that when using an HCN hydrolysis sorbent comprising one or more metals or oxides of metals or combinations thereof, wherein the metals are selected from the group of Ag, Sn, Mo, Fe and Zn, removal of HCN as well as $H_2S$ and/or COS to levels in the ppbv range is possible.

ZnO is an especially preferred HCN hydrolysis sorbent because it enables removal of HCN below 10 ppbv and of $H_2S$ and and/or COS below 2 ppbv. Another important advantage of ZnO is that the occurrence of unwanted side reactions such as water gas shift, hydrogenation of CO and $CO_2$ and methanol synthesis is negligible or even completely absent.

It will be understood that preferably the HCN hydrolysis sorbent does not comprise any components which could act as a catalyst for the preparation of hydrocarbons. The catalytic preparation of hydrocarbons could lead to unwanted deposits of hydrocarbons on the HCN hydrolysis sorbent. Especially deposition of heavy hydrocarbons or waxy residues should be avoided. Known catalyst for the preparation of hydrocarbons are catalyst comprising metals or compounds selected from group VIII of the Periodic Table of the Elements. Therefore, in a preferred embodiment the HCN hydrolysis sorbent is substantially free of metals or compounds comprising metals from group VIII of the Periodic Table of the Elements, meaning that the amount of metals or compounds comprising metals from group VIII of the Periodic Table of the Elements is less than 100 ppmw, preferably less than 10 ppmw based on the total HCN hydrolysis sorbent. In particular, preferably the HCN hydrolysis sorbent is substantially free of metals selected from the group of nickel, cobalt and ruthenium.

It will also be understood that it is preferred that the HCN hydrolysis sorbent does not comprise any components which could act as methanation catalysts. Methanation, the hydrogenation of carbon monoxide and/or carbon dioxide to methane, is a highly exothermic reaction and therefore needs to be avoided. A well-known methanation catalyst is nickel. Therefore, in a preferred embodiment the HCN hydrolysis sorbent is substantially free of nickel, meaning that the amount of nickel is less than 100 ppmw, preferably less than 10 ppmw, based on the total HCN hydrolysis sorbent.

The HCN hydrolysis sorbent can be used in any suitable form known in the art, which allows contacting the synthesis gas with the HCN hydrolysis sorbent. It is preferred to provide the HCN hydrolysis sorbent in a form which is easy to handle, in particular in loading and unloading the HCN hydrolysis sorbent from a suitable reactor, position or site. Pressing the HCN hydrolysis sorbent provides one suitable form of the material. One pressed form includes tablets, which tablets are then relatively easily loadable and unloadable from a reaction vessel through which the gas stream can pass. However, a disadvantage of using a pressed form is that the surface available for contact with the feed synthesis gas is relatively low. Thus, it is preferred that the HCN hydrolysis sorbent is supported on support material, especially an inorganic support material in order to, for example, increase the surface area, pore volume and pore diameter. Preferably, support material selected from the group of alumina, silica, titania, zirconia, carbon, silicon carbide and kieselguhr is used. Either one type of support material can be used or mixtures of different support materials can be used.

In a preferred embodiment, the HCN hydrolysis sorbent comprises alumina. It has been found that the presence of alumina results in an even better removal of COS. Preferably, the amount of alumina present in the HCN hydrolysis sorbent is in the range of from 0.1 to 5 wt %, more preferably from 0.1 to 3 wt %, based on total HCN hydrolysis sorbent.

Preferably, step (a) is performed at a temperature in the range of from 100 to 240° C., more preferably from 140° C. to 200° C. It has been found that at the preferred temperatures, removal of HCN to levels in the ppbv range, even as low as below 10 ppbv can be achieved. In an especially preferred embodiment, step (a) is performed at a temperature in the range of from 100 to 240° C., more preferably from 140° C. to 200° C. and the HCN hydrolysis sorbent comprises one or more metals or oxides of metals or combinations thereof from the group of Ag, Sn, Mo, Fe and Zn. This enables removal of both HCN and $H_2S$ and/or COS to low levels, even in the ppbv range.

Preferably, step (a) is performed at a pressure in the range of from 1 to 100 bara, preferably from 20 to 80 bara, more preferably from 40 to 60 bara.

The gas space velocity may be similar to current processes, for example in the range 1,000-100,000/h, preferably approximately 10,000-20,000/h.

The synthesis gas may be contacted with HCN hydrolysis sorbent either once or a plurality of times, preferably in a serial manner using more than one guard bed comprising HCN hydrolysis sorbent, so as to continue to reduce the HCN content and optionally also the H2S and/or COS content. Using the same material in more than one cleaning or guard bed provides additional advantages. If one guard bed fails, there is immediate 'back up' to maintain guard of the catalyst material, which material is generally much more expensive than guard bed material. This back-up helps in terms of safety as well as catalyst preserver. It also allows a guard bed to be off-line for other reasons, such as reloading, regeneration, cleaning, servicing or emergencies, whilst the other(s) guard bed is maintained and the overall catalytic process continues. Using individual guard bed materials for different impurities requires the catalytic process to stop every time any guard bed material or guard bed unit must be off-line or malfunctions.

The present invention provides a simple but effective process for the removal of HCN and optionally COS and/or $H_2S$ from a gas stream, especially with a material that can easily be located in existing guard beds—avoiding any re-engineering time and costs. As set out hereinbefore, the HCN hydrolysis sorbent also enables removal of other contaminants, providing a single solution to remove impurities.

It is believed that in step (a), HCN is converted to $NH_3$. Preferably, at least 80%, more preferably at least 90% and still more preferably at least 95% of the HCN is converted to $NH_3$.

In step (b), the synthesis gas comprising $NH_3$ is contacted with an acidic cation exchange resin in the presence of water to remove $NH_3$. Typically, $NH_3$ is removed as $NH_4+$ by exchange with hydrogen ions from an acidic cation exchange resin.

Acidic cation exchange resins are known in the art and are typically used as an insoluble support structure in the form of small beads fabricated from an organic polymer substrate. The surface of the substrate suitable comprises sites with easily trapped and released ions.

Preferably, a strongly acidic cation exchange resin is used. Preferred cation exchange resins include cation exchange resins having functional groups of the sulphonic acid type having the generic formula $RSO_3H$, wherein R is a polymer chain of the resin.

Especially preferred acidic cation exchange resins are thermally stable acidic cation exchange resins, more preferably acidic cation exchange resins that can be used at a temperature above 100° C. or even above 120° C. The use of a thermally stable acidic cation exchange resin enables performing step (b) at a temperature above 100° C., preferably from 120 to 200° C., more preferably from 150 to 200° C. By performing step (b) at the preferred temperatures, the purified synthesis gas will already be at elevated temperature, preferably above 150° C. This enables using the purified synthesis gas in a catalytic hydrocarbon synthesis reaction taking place at elevated temperature, without the need for excessive heating up of the washed purified synthesis gas. Hence, the overall process can be performed in a more efficient way. In particular, the purified synthesis gas at elevated temperature is suitable for use in a hydrocarbon synthesis process, especially a Fischer-Tropsch hydrocarbon synthesis process, performed at a temperature in the range of from 150 to 300° C.

In a preferred embodiment, the process comprises the steps of:
(a) contacting feed synthesis gas comprising HCN with a HCN hydrolysis sorbent in the presence of water at a temperature in the range of from 100 to 240° C., preferably from 140° C. to 200° C., thereby obtaining synthesis gas comprising $NH_3$;
(b) contacting the synthesis gas comprising $NH_3$ with an acidic cation exchange resin in the presence of water at a temperature in the range of from 120 to 200° C., preferably from 150 to 200° C. to remove $NH_3$, thereby obtaining purified synthesis gas;
(c) contacting the purified synthesis gas with a hydrocarbon synthesis catalyst at a temperature in the range of 150 to 300° C., preferably from 180 to 260° C., to produce hydrocarbons.

In this preferred embodiment, the degree of variation in temperature (so-called temperature swing) is reduced, enabling a more energy-efficient process. Furthermore, the capital expenditure for the process is lower, as the need for heating and/or cooling equipment inbetween the process steps is reduced.

In a most preferred embodiment, the process comprises the steps of:
(a) contacting feed synthesis gas comprising HCN, $H_2S$ and/or COS with a HCN hydrolysis sorbent comprising one or more metals or oxides of metals or combinations thereof from the group of Ag, Sn, Mo, Fe and Zn in the presence of water at a temperature in the range of from 100 to 240° C., preferably from 140° C. to 200° C., thereby obtaining synthesis gas depleted in $H_2S$ and/or in COS and comprising $NH_3$;
(b) contacting the synthesis gas depleted in $H_2S$ and/or in COS comprising $NH_3$ with an acidic cation exchange resin in the presence of water at a temperature in the range of from 120 to 200° C., preferably from 150 to 200° C. to remove $NH_3$, thereby obtaining purified synthesis gas;
(c) contacting the purified synthesis gas with a hydrocarbon synthesis catalyst at a temperature in the range of 150 to 300° C., preferably from 180 to 260° C., to produce hydrocarbons.

This most preferred embodiment offers the additional advantage that in addition to HCN, also $H_2S$ and/or COS are removed to low levels, in the ppbv range. This enables a simple and efficient process to produce a purified synthesis gas stream, which purified synthesis gas stream can now be used in a hydrocarbon synthesis step.

The purified synthesis gas comprises predominantly hydrogen and carbon monoxide and very low levels, in the ppbv range, of HCN, $NH_3$ and optionally $H_2S$ and/or COS.

Typically, the amount of HCN in the purified synthesis gas is below 50 ppbv, preferably below 20 ppbv or even below 10 ppbv based on the purified synthesis gas.

Typically, the amount of $NH_3$ in the purified synthesis gas is below 50 ppbv, preferably below 20 ppbv or even below 10 ppbv based on the purified synthesis gas.

If applicable, the amount of $H_2S$ in the purified synthesis gas is preferably 10 ppbv or less, more preferably 5 ppbv or less and most preferably 1 ppbv based on the purified synthesis gas.

If applicable, the amount of COS in the purified synthesis gas is preferably 5 ppbv or less, more preferably 1 ppbv or less, based on the purified synthesis gas.

Preferably the purified synthesis gas prepared by the present invention is used in a number of chemical reactions, in particular in Fischer-Tropsch reactions or processes. Catalysts for use in the Fischer Tropsch reaction frequently comprise, as the catalytically active component, a metal from Group VIII of the Periodic Table of Elements. Particular catalytically active metals include ruthenium, iron, cobalt and nickel. Cobalt is a preferred catalytically active metal.

The catalytically active metal is preferably supported on a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica, alumina and titania.

The amount of catalytically active metal on the carrier is preferably in the range of from 3 to 300 ppbw per 100 ppbw of carrier material, more preferably from 10 to 80 ppbw, especially from 20 to 60 ppbw.

If desired, the catalyst may also comprise one or more metals or metal oxides as promoters. Suitable metal oxide promoters may be selected from Groups IIA, IIIB, IVB, VB and VIB of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are very suitable promoters. Particularly preferred metal oxide promoters for the catalyst used to prepare the waxes for use in the present invention are manganese and zirconium oxide. Suitable metal promoters may be selected from Groups VIIB or VIII of the Periodic Table. Rhenium and Group VIII noble metals are particularly suitable, with platinum and palladium being especially preferred. The amount of promoter present in the catalyst is suitably in the range of from 0.01 to 100 pbw, preferably 0.1 to 40, more preferably 1 to 20 pbw, per 100 pbw of carrier. The most preferred promoters are selected from vanadium, manganese, rhenium, zirconium and platinum.

The catalytically active metal and the promoter, if present, may be deposited on the carrier material by any suitable treatment, such as impregnation, kneading and extrusion. After deposition of the metal and, if appropriate, the promoter on the carrier material, the loaded carrier is typically subjected to calcination. The effect of the calcination treatment is to remove crystal water, to decompose volatile decomposition products and to convert organic and inorganic compounds to their respective oxides. After calcination, the resulting catalyst may be activated by contacting the catalyst with hydrogen or a hydrogen-containing gas, typically at temperatures of about 200 to 350° C. Other processes for the preparation of Fischer-Tropsch catalysts comprise kneading/mulling, often followed by extrusion, drying/calcination and activation.

The hydrocarbon synthesis step may be performed under conventional hydrocarbon synthesis conditions known in the art. Preferably, the catalytic conversion may be effected at a temperature in the range of from 150 to 300° C., preferably from 180 to 260° C.

It is an advantage of the process according to the invention that removal of HCN and $NH_3$ and optionally COS and/or $H_2S$ is done in similar temperature ranges as the hydrocarbon synthesis. This enables a more efficient overall process, as there is no need for additional cooling and no need for excessive heating in between the different process steps.

Typical total pressures for the catalytic conversion process are in the range of from 1 to 200 bar absolute, more preferably from 10 to 70 bar absolute. In the catalytic conversion process especially more than 75 wt % of $C_5^+$, preferably more than 85 wt % $C_5^+$ hydrocarbons are formed. Depending on the catalyst and the conversion conditions, the amount of heavy wax ($C_{20}^+$) may be up to 60 wt %, sometimes up to 70 wt %, and sometimes even up till 85 wt %. Preferably a cobalt catalyst is used, a low $H_2/CO$ ratio is used and a low temperature is used (190-230° C.). To avoid any coke formation, it is preferred to use an $H_2/CO$ ratio of at least 0.3. It is especially preferred to carry out the Fischer-Tropsch reaction under such conditions that the SF-alpha value, for the obtained products having at least 20 carbon atoms, is at least 0.925, preferably at least 0.935, more preferably at least 0.945, even more preferably at least 0.955.

Preferably, a Fischer-Tropsch catalyst is used, which yields substantial quantities of paraffins, more preferably substantially unbranched paraffins. A most suitable catalyst for this purpose is a cobalt-containing Fischer-Tropsch catalyst. Such catalysts are described in the literature, see e.g. AU 698392 and WO 99/34917.

The Fischer-Tropsch process may be a slurry FT process or a fixed bed FT process, especially a multitubular fixed bed.

The invention also provides the products obtained in the Fischer-Tropsch reaction, including distillates and hydroconverted products, e.g. fuels such as naphtha, kero and diesel, base oils and n-paraffins, lower detergent feedstocks and wax.

The invention will now be illustrated with the following non-limiting example.

EXAMPLE 1

A synthesis gas comprising HCN and having a composition: CO 35.6 v/v %, $H_2$ 59.1 v/v %, $N_2$ 0.8 v/v %, $H_2O$ 1.1 v/v %, $CO_2$ 2.5 v/v % and HCN 110 ppmv was contacted with a HCN hydrolysis sorbent comprising ZnO during certain time periods. The experiments were conducted in a multipurpose gas treating micro flow unit. The reactor had an internal diameter of 15 mm and was employed with a centrally placed thermowell with a diameter of 4 mm. Approximately 10 ml of HCN hydrolysis sorbent was used. Process conditions: GHSV=9300 h−1, P=40 bar. The HCN conversion as measured is given in table 1.

TABLE 1

| HCN conversion over ZnO containing guard bed at various temperatures. | |
|---|---|
| Temperature (° C.) | HCN Conversion (%) |
| 140 | 16.2 |
| 160 | 32.5 |
| 180 | 73.1 |
| 200 | 99.2 |

The converted syngas was contacted in a separate reactor with Amberlyst 15 at a GHSV of 67.000 and a temperature of 100° C. The resulting syngas showed an ammonia content of less than 10 ppbv.

EXAMPLE 2

A synthesis gas comprising HCN and having a composition: CO 35.5 v/v %, $H_2$ 61.5 v/v %, $N_2$ 0.3 v/v %, $H_2O$ 0.2 v/v %, $CO_2$ 2.2 v/v % and HCN 2000 ppmv was contacted with a HCN hydrolysis sorbent comprising TiO2 during certain time periods. The experiments were conducted in a multipurpose gas treating micro flow unit. The reactor had an internal diameter of 15 mm and was employed with a centrally placed thermowell with a diameter of 4 mm. Approximately 10 ml of HCN hydrolysis sorbent was used. Process conditions: GHSV=9900 h−1, P=40 bar. The converted syngas was contacted in a separate reactor with Amberlyst 15 at a GHSV of 9900 h-1and a temperature of 25° C. The resulting syngas showed an ammonia content of less than 10 ppbv.

What is claimed is:

1. A process for treating a synthesis gas, the process comprising the steps of:
    (a) contacting a feed synthesis gas comprising HCN with an HCN hydrolysis sorbent in the presence of water, thereby obtaining synthesis gas comprising $NH_3$;
    (b) contacting the synthesis gas comprising $NH_3$ with an acidic cation exchange resin in the presence of water to remove $NH_3$, thereby obtaining a purified synthesis gas.

2. A process according to claim 1, wherein in step (b) an acidic cation exchange resin comprises a sulfonic acid functional group.

3. A process according to claim 1, wherein step (b) is performed at a temperature in the range of from 120 to 200° C.

4. A process according to claim 3, wherein step (a) is performed at a temperature in the range of from 100 to 240° C.

5. A process according to claim 4, wherein the purified synthesis gas comprises less than 10 ppbv HCN.

6. A process according to claim 5, wherein the purified synthesis gas comprises less than 5 ppbv $NH_3$.

7. A process according to claim 6, wherein the HCN hydrolysis sorbent comprises one or more metals or oxides of the metals or combinations thereof and the metals are selected from the group consisting of Ag, Sn, Mo, Fe and Zn.

8. A process according to claim 7, wherein the feed synthesis gas further comprises $H_2S$ and/or COS and at least part of these compounds are removed from the feed synthesis gas.

9. A process according to claim 8, wherein the feed synthesis gas is obtained by contacting synthesis gas exiting a synthesis gas generation unit with scrubbing liquid to remove particulate matter.

10. A process according to claim 9, further comprising the step of:
(c) contacting the purified synthesis gas with a hydrocarbon synthesis catalyst comprising cobalt, at a temperature in the range of 150 to 300° C. to produce hydrocarbons.

* * * * *